US012676861B2

(12) United States Patent
Schade et al.

(10) Patent No.: US 12,676,861 B2
(45) Date of Patent: Jul. 7, 2026

(54) SYSTEMS AND METHODS FOR CORRELATED ACCESS INSIGHTS AND GROUP REPORTING

(71) Applicant: SailPoint Technologies, Inc., Austin, TX (US)

(72) Inventors: Alexander Michael Schade, San Francisco, CA (US); Shon Thomas Dalezman, Miami Beach, FL (US); David W. Owens, Bend, OR (US)

(73) Assignee: SailPoint Technologies, Inc., Austin, TX (US)

( * ) Notice: Subject to any disclaimer, the term of this patent is extended or adjusted under 35 U.S.C. 154(b) by 329 days.

(21) Appl. No.: 18/179,723

(22) Filed: Mar. 7, 2023

(65) Prior Publication Data

US 2024/0305645 A1     Sep. 12, 2024

(51) Int. Cl.
H04L 9/40          (2022.01)
(52) U.S. Cl.
CPC .......... H04L 63/104 (2013.01); H04L 63/102 (2013.01)
(58) Field of Classification Search
CPC .... G06F 21/445; G06F 21/629; G06F 21/604; G06F 16/27; G06F 11/3438; G06F 2209/508; G06F 11/3476; H04L 63/0892; H04L 63/10; H04L 63/20; H04L 63/0815; H04L 63/104; H04L 47/70; G06Q 30/0255; G06Q 20/4014; G06Q 10/06; G06Q 10/10
See application file for complete search history.

(56) References Cited

U.S. PATENT DOCUMENTS

| | | | | |
|---|---|---|---|---|
| 5,949,415 A * | 9/1999 | Lin | ..................... | G06F 11/3476 |
| | | | | 715/740 |
| 6,947,989 B2 * | 9/2005 | Gullotta | ................ | H04L 63/105 |
| | | | | 379/201.12 |
| 7,523,191 B1 * | 4/2009 | Thomas | .............. | G06F 11/3476 |
| | | | | 709/224 |
| 7,958,234 B2 * | 6/2011 | Thomas | .............. | G06F 11/3476 |
| | | | | 709/224 |
| 8,087,062 B2 * | 12/2011 | Koeda | ................... | G06F 21/629 |
| | | | | 713/169 |
| 8,250,045 B2 * | 8/2012 | Er | ......................... | G06F 21/629 |
| | | | | 707/702 |
| 8,612,582 B2 * | 12/2013 | Dare | ........................ | G06F 8/60 |
| | | | | 705/40 |

(Continued)

*Primary Examiner* — Scott L Jarrett
(74) *Attorney, Agent, or Firm* — Sprinkle IP Law Group

(57)          ABSTRACT
A groups service implementing a group reporting tool can provide a user interface on a user device. The user interface can include a group settings or group configuration page. A user can select, through the group settings page, a metadata field for group mapping. Responsive to the selection of the metadata field, the groups service can start a group sync process which fetches a usage history from a usage database. The groups service can determine, based on the metadata field and the usage history, properties of end users of an enterprise accessing a software product integrated with the an identity and access management (IAM) system and generate groups based on the properties of the end users of the enterprise accessing the software product integrated with the IAM system. A group listing page or group reporting page containing the groups can then be generated for presentation on the user device.

18 Claims, 8 Drawing Sheets

(56)                 References Cited

U.S. PATENT DOCUMENTS

| | | | | |
|---|---|---|---|---|
| 8,713,632 | B2* | 4/2014 | Koeda | G06F 21/629 |
| | | | | 726/19 |
| 8,745,213 | B2* | 6/2014 | Dare | H04L 41/5041 |
| | | | | 709/224 |
| 8,788,655 | B2* | 7/2014 | Dare | H04L 67/34 |
| | | | | 709/224 |
| 8,839,444 | B2* | 9/2014 | Roshchin | G06F 21/105 |
| | | | | 726/26 |
| 8,856,322 | B2* | 10/2014 | Dare | G06F 9/54 |
| | | | | 709/227 |
| 8,954,564 | B2* | 2/2015 | Ferris | G06Q 30/08 |
| | | | | 709/224 |
| 9,202,225 | B2* | 12/2015 | Ferris | G06Q 40/12 |
| 9,536,065 | B2* | 1/2017 | Bouse | G06F 21/32 |
| 9,705,871 | B2* | 7/2017 | Engan | H04L 63/0876 |
| 9,876,803 | B2* | 1/2018 | Miu | H04L 63/126 |
| 10,878,079 | B2* | 12/2020 | Vepa | G06F 21/335 |
| 10,922,653 | B2* | 2/2021 | Tondepu | H04L 63/10 |
| 10,951,625 | B2* | 3/2021 | Jadhav | G06F 21/6218 |
| 11,290,336 | B1* | 3/2022 | Das | G06F 9/45512 |
| 11,379,561 | B2* | 7/2022 | Shatov | G06F 21/121 |
| 11,528,279 | B1* | 12/2022 | Armada | G06F 16/27 |
| 12,063,404 | B2* | 8/2024 | Kim | H04N 21/2668 |
| 12,294,645 | B2* | 5/2025 | Kunz | H04L 9/0852 |
| 12,368,651 | B2* | 7/2025 | Mihovilovic | G06F 3/04817 |

| | | | | |
|---|---|---|---|---|
| 2005/0210293 | A1* | 9/2005 | Ohtani | G06F 21/604 |
| | | | | 726/5 |
| 2008/0189400 | A1* | 8/2008 | Norrie | H04L 9/40 |
| | | | | 709/223 |
| 2010/0131896 | A1* | 5/2010 | Fitzmaurice | G06T 19/00 |
| | | | | 715/811 |
| 2011/0295727 | A1* | 12/2011 | Ferris | G06Q 30/04 |
| | | | | 709/224 |
| 2011/0295998 | A1* | 12/2011 | Ferris | H04L 47/70 |
| | | | | 709/224 |
| 2012/0036245 | A1* | 2/2012 | Dare | H04L 65/1063 |
| | | | | 709/223 |
| 2012/0036440 | A1* | 2/2012 | Dare | G06F 9/452 |
| | | | | 715/734 |
| 2012/0036442 | A1* | 2/2012 | Dare | G06F 8/60 |
| | | | | 715/736 |
| 2013/0086260 | A1* | 4/2013 | Biazetti | G06F 21/604 |
| | | | | 709/224 |
| 2013/0283175 | A1* | 10/2013 | Faridian | H04L 41/00 |
| | | | | 715/736 |
| 2015/0106736 | A1* | 4/2015 | Torman | G06F 3/04842 |
| | | | | 715/745 |
| 2016/0105420 | A1* | 4/2016 | Engan | H04W 12/068 |
| | | | | 455/411 |
| 2017/0006010 | A1* | 1/2017 | Miu | G06Q 20/4016 |
| 2019/0102849 | A1* | 4/2019 | Bertot | G06Q 10/06315 |

* cited by examiner

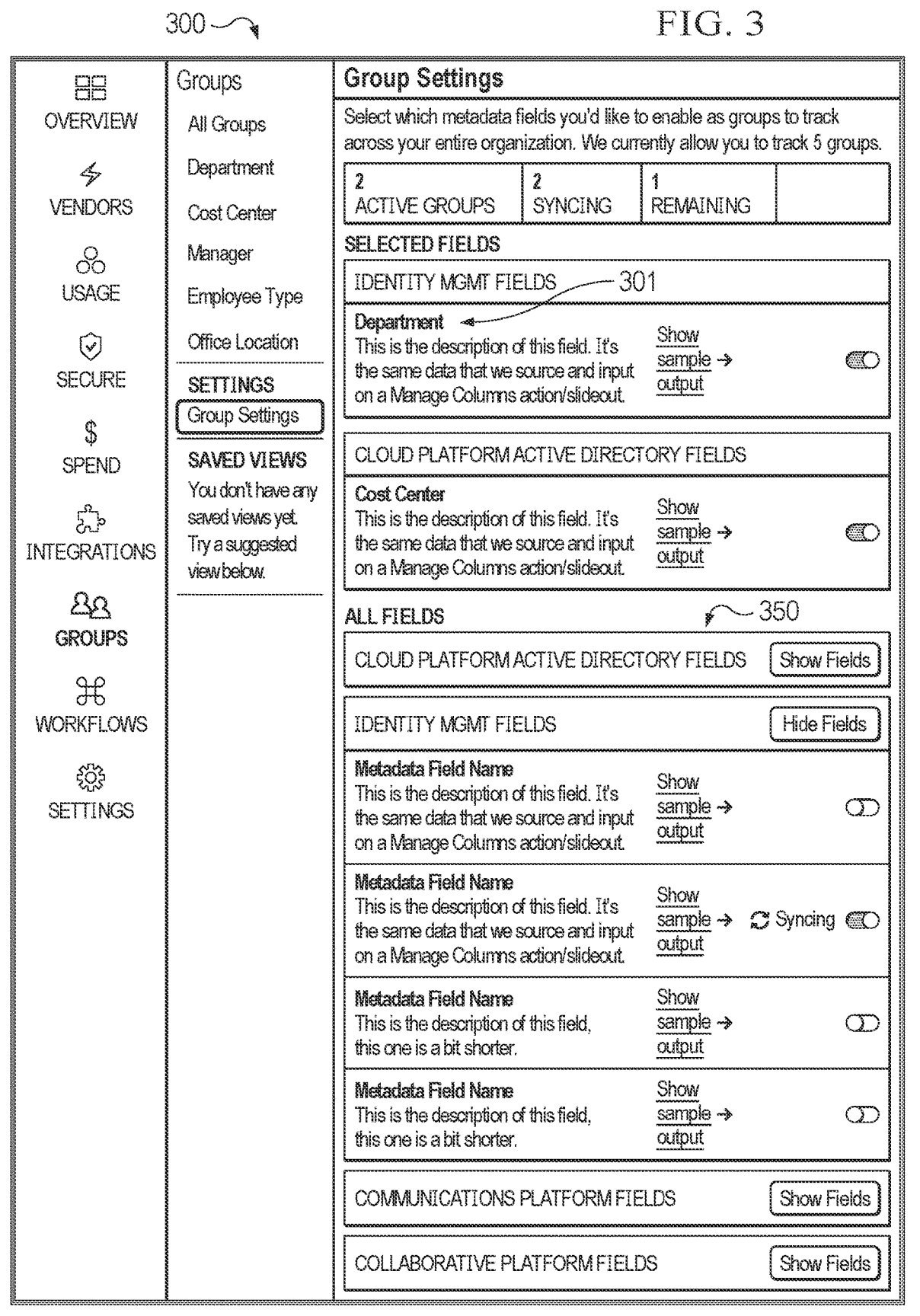

300 ⌇                                 FIG. 3

| Navigation | Groups | Group Settings |
|---|---|---|
| OVERVIEW | All Groups | Select which metadata fields you'd like to enable as groups to track across your entire organization. We currently allow you to track 5 groups. |
| VENDORS | Department | |
| USAGE | Cost Center | |
| SECURE | Manager | |
| SPEND | Employee Type | |
| INTEGRATIONS | Office Location | |
| GROUPS | SETTINGS | |
| WORKFLOWS | Group Settings | |
| SETTINGS | SAVED VIEWS | |

Group Settings

Select which metadata fields you'd like to enable as groups to track across your entire organization. We currently allow you to track 5 groups.

| 2 ACTIVE GROUPS | 2 SYNCING | 1 REMAINING | |
|---|---|---|---|

SELECTED FIELDS

IDENTITY MGMT FIELDS —— 301

Department
This is the description of this field. It's the same data that we source and input on a Manage Columns action/slideout.    Show sample → output    ⬤

CLOUD PLATFORM ACTIVE DIRECTORY FIELDS

Cost Center
This is the description of this field. It's the same data that we source and input on a Manage Columns action/slideout.    Show sample → output    ⬤

ALL FIELDS ⌇ 350

| CLOUD PLATFORM ACTIVE DIRECTORY FIELDS | Show Fields |
|---|---|

| IDENTITY MGMT FIELDS | Hide Fields |
|---|---|

Metadata Field Name
This is the description of this field. It's the same data that we source and input on a Manage Columns action/slideout.    Show sample → output    ⬭

Metadata Field Name
This is the description of this field. It's the same data that we source and input on a Manage Columns action/slideout.    Show sample → output    ↻ Syncing ⬤

Metadata Field Name
This is the description of this field, this one is a bit shorter.    Show sample → output    ⬭

Metadata Field Name
This is the description of this field, this one is a bit shorter.    Show sample → output    ⬭

| COMMUNICATIONS PLATFORM FIELDS | Show Fields |
|---|---|

| COLLABORATIVE PLATFORM FIELDS | Show Fields |
|---|---|

SAVED VIEWS
You don't have any saved views yet. Try a suggested view below.

OVERVIEW

VENDORS

USAGE

SECURE

SPEND

INTEGRATIONS

GROUPS

WORKFLOWS

SETTINGS

Groups / Cost Center / Cost Center 23

| Name ▼ | Total User Count ▼ | Application Count ▼ | Q Search | + Add Filter | ⋯ |

Active Filters
Clear

+ Save View

Groups

All Groups

Department

Cost Center

Manager

Employee Type

Office Location

SETTINGS

Group Settings

SAVED VIEWS

You don't have any saved views yet. Try a suggested view below.

Select a Cost Center

| 8 | 1 |
| GROUPINGS | SYNCING |

| GROUP VALUE NAME | TOTAL USERS | APPLICATIONS | |
|---|---|---|---|
| COST CENTER 01 | 13 | 23 | ∨ |
| COST CENTER 02 | 13 | 23 | ∨ |
| COST CENTER 03 | 13 | 23 | ∨ |
| COST CENTER 04 | 13 | 23 | ∨ |
| COST CENTER 05 | 13 | 23 | ∨ |
| COST CENTER 06 | 13 | 23 | ∨ |
| COST CENTER 07 | 13 | 23 | ∨ |
| COST CENTER 08 | 13 | 23 | ∨ |

Groups / Cost Center / Cost Center 23

| Groups | | DATE RANGE 🗓 | Rank ▼ | Total Users ▼ | Active Users ▼ | Vendor ▼ | Utilization ▼ | Instance ▼ | 🔍 Search |
|---|---|---|---|---|---|---|---|---|---|
| All Groups | | Past 30 days | | | | | | | |

Active Filters   ⊕ Save View
Clear

< Back to all Cost Centers

Cost Center 23

| 29 | 22 | 1,428 |
|---|---|---|
| APPS | VENDORS | TOTAL USERS |

SHOWING 1-13

SHOW 10 20 ALL

| Application Name | Vendor | Active Users | Total Users | Utilization % 300 | Rank | Created At |
|---|---|---|---|---|---|---|
| VENDOR_1_APP | VENDOR_1 | 68 | 110 | 35% | 1 | 11/19/2019 |
| VENDOR_1_APP | VENDOR_1 | 68 | 110 | 35% | 15 | 11/19/2019 |
| VENDOR_1_APP | VENDOR_1 | 68 | 110 | 35% | 14 | 11/19/2019 |
| VENDOR_1_APP | VENDOR_1 | 68 | 110 | 35% | 8 | 11/19/2019 |
| VENDOR_2_APP | VENDOR_2 | 68 | 110 | 35% | 7 | 11/19/2019 |
| VENDOR_3_APP | VENDOR_3 | 68 | 110 | 35% | 21 | 11/19/2019 |
| VENDOR_4_APP | VENDOR_4 | 68 | 110 | 35% | 33 | 11/19/2019 |
| VENDOR_5_APP | VENDOR_5 | 68 | 110 | 35% | 2 | 11/19/2019 |
| VENDOR_6_APP | VENDOR_6 | 68 | 110 | 35% | 5 | 11/19/2019 |
| VENDOR_7_APP | VENDOR_7 | 68 | 110 | 35% | 6 | 11/19/2019 |

OVERVIEW

VENDORS

SPEND

USAGE

SECURE

INTEGRATIONS

GROUPS

WORKFLOWS

SETTINGS

Department

Cost Center

Manager

Employee Type

Office Location

SETTINGS
Group Settings

SAVED VIEWS
You don't have any saved views yet. Try a suggested view below.

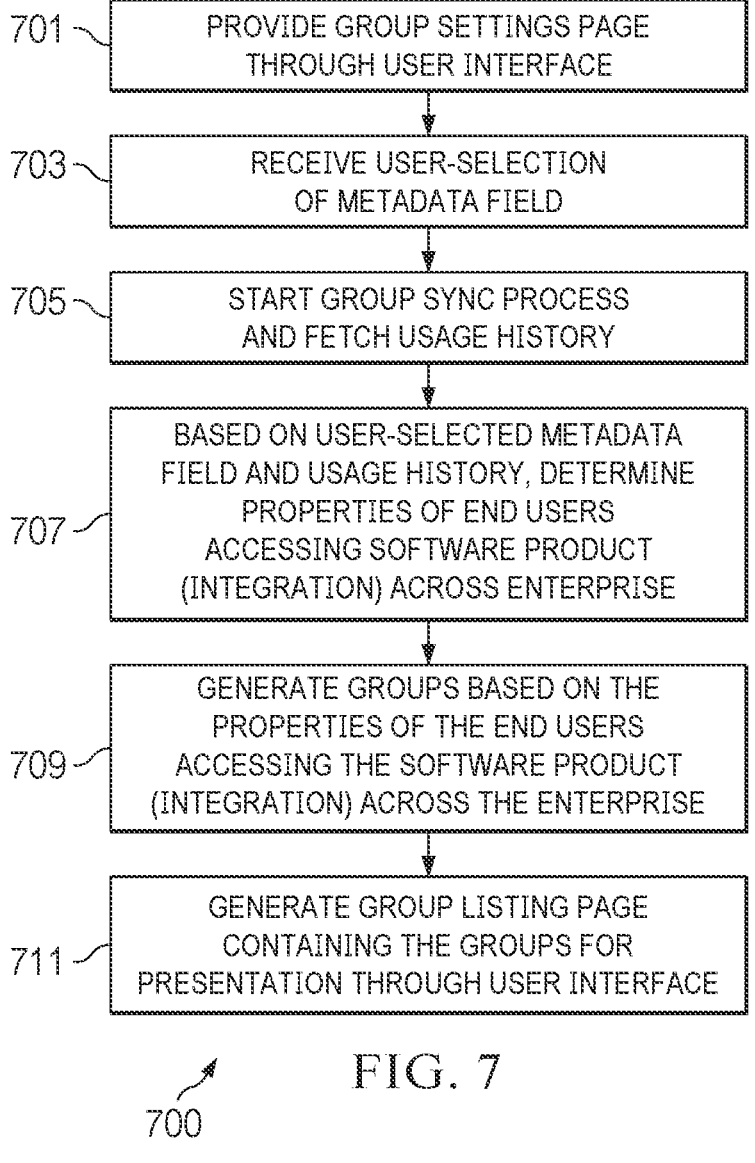

701 — PROVIDE GROUP SETTINGS PAGE THROUGH USER INTERFACE

703 — RECEIVE USER-SELECTION OF METADATA FIELD

705 — START GROUP SYNC PROCESS AND FETCH USAGE HISTORY

707 — BASED ON USER-SELECTED METADATA FIELD AND USAGE HISTORY, DETERMINE PROPERTIES OF END USERS ACCESSING SOFTWARE PRODUCT (INTEGRATION) ACROSS ENTERPRISE

709 — GENERATE GROUPS BASED ON THE PROPERTIES OF THE END USERS ACCESSING THE SOFTWARE PRODUCT (INTEGRATION) ACROSS THE ENTERPRISE

711 — GENERATE GROUP LISTING PAGE CONTAINING THE GROUPS FOR PRESENTATION THROUGH USER INTERFACE

SYSTEMS AND METHODS FOR CORRELATED ACCESS INSIGHTS AND GROUP REPORTING

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to identity and access management. In particular, this disclosure relates to a computer-implemented group reporting tool for correlating access insights useful for identity and access management. Even more specifically, this disclosure relates to a system, method, and computer program product for correlating access insights through group reporting.

BACKGROUND OF THE RELATED FIELD

Identity and Access Management (IAM), also known as Identity Management (IM) or Identity Governance (IG), is in the field of computer security concerned with the enablement and enforcement of policies and measures which allow and ensure that the right individuals access the right resources at the right times and for the right reasons. Corporations and enterprises alike often rely on IAM technology to ensure appropriate access to resources across increasingly heterogeneous technological environments and to meet increasingly rigorous compliance regulations and requirements.

Today, escalating security and privacy concerns continue to drive the governance, access risk management, and compliance to the forefront of IAM solutions. To effectively meet the requirements and desires imposed upon enterprises for identity and access management, these enterprises may be required to prove that they have strong and consistent controls over who has access to critical applications and data. In this context, and in response to regulatory requirements and the growing security access risk, most enterprises utilizes computer-implemented tools for monitoring, managing, analyzing, and reporting user access and/or identity.

As enterprises continue to scale at an increasing speed, analyzing access activity data in the context of teams face many technical challenges due to the number of teams, the size of each team, the massive amount of activity data, and so on. For this reason, a current approach is to analyze activity data through groups, such as departments, geographies, subsidiaries, cost centers, managers, etc.

However, a group reporting tool implementing the current approach is limited to generating data from department fields obtained when users log in through a single sign-on (SSO) portal. These department fields come from the SSO. Users can use this group reporting tool to analyze activity data by departments that come from each of a plurality of integrations associated with the SSO. However, such an analysis is limited to the given department fields. Users cannot modify or choose department fields. The current approach, therefore, is not scalable or customizable.

In view of the foregoing, there is a need for an enhanced, customizable, adaptable, and scalable group reporting tool that can help correlating access insights useful for identity and access management. Embodiments disclosed herein can address this need and more.

SUMMARY OF THE DISCLOSURE

The invention disclosed herein takes a customizable approach to group reporting. This customizable approach allows clients of an IAM system to use a group reporting tool to analyze group data by arbitrary metadata fields. The IAM system already includes metadata fields that are unique per an integration (e.g., cloud platform fields, active directory fields, identity management fields, communications platform fields, collaborative platform fields, etc.). The invention disclosed herein leverages the metadata that the IAM system pulls in at a user level to enable custom grouping. In this way, clients can analyze data by almost any metadata field that the IAM system already specifies.

In some embodiments, a group reporting method can include providing, by a groups service implementing the group reporting tool disclosed herein, a user interface of the groups service on a user device. The user interface can include a group settings or group configuration page. The group reporting method can further include receiving, through the group settings page, a selection of a metadata field. Responsive to the selection of the metadata field, the groups service can start a group sync process which fetches a usage history from a usage database.

In some embodiments, the group reporting method can further include determining, based on the metadata field and the usage history, properties of end users of an enterprise accessing a software product integrated with the IAM system and generating a plurality of groups based on the properties of the end users of the enterprise accessing the software product integrated with the IAM system. A group listing page or group reporting page containing the plurality of groups can then be generated for presentation on the user device.

In some embodiments, the group reporting method can further include determining, based on the usage history, timepoints of when the end users of the enterprise accessing the software product and group memberships of the end users and generating, based on the timepoints, the software product, and the group memberships of the end users, a time series chart shows active and inactive users of the software product over time.

In some embodiments, the group reporting method can further include determining, utilizing a count-distinct algorithm, an accurate count of distinct users of the enterprise over a time window. In some embodiments, the count-distinct algorithm comprises the HyperLogLog algorithm discussed above.

In some embodiments, the group reporting method can further include receiving a selected group from the group listing page and generating a group value listing page containing a list of synced values for the selected group. In this case, the synced values contain vendors and applications for the selected group.

In some embodiments, the group reporting method can further include receiving a selected vendor from the group value listing page and generating a vendor page with data for the selected group, the selected vendor, and the software product. The vendor page can include a time series chart showing active and inactive users of the software product over time.

Using the metadata fields to customize group reporting allows any integration to support group-level reporting. This customization is not limited to the integrations for which the IAM system was initially built and can be used for generating and viewing many types of group reports, including those showing software product utilizations across an enterprise and corresponding breakdowns by license types.

Further, the group reporting tool disclosed herein can be implemented with various functionalities, such as Workflow Engine, Suggested Filters, and Saved Views, allowing generation of intelligent recommendations for clients.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein like reference numbers generally indicate like features. Note that the features illustrated in the drawings are not necessarily drawn to scale.

FIG. 3 depicts an example of a user interface showing a group settings page through which a user can select metadata fields to enable as groups for tracking activities across an enterprise according to some embodiments disclosed herein.

FIG. 4 depicts another example of a user interface showing a group value listing through which a user can select a cost center and zoom in on the corresponding usage according to some embodiments disclosed herein.

FIG. 5 depicts an example of a user interface showing a group value application listing with usage data according to some embodiments disclosed herein.

FIG. 7 is a flow chart that illustrates an example of a group reporting method according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As alluded to above, a group reporting tool implementing the current approach is limited to generating group reporting data from department fields obtained when users log in, through a single sign-on (SSO) portal, to frontend applications of various integrated platforms integrated with an IAM system. SSO is an authentication process in which a user can access more than one system or application by entering a single user ID and password. SSO is known to those skilled in the art and thus is not further described herein.

Users can use this group reporting tool, which can be part of the IAM system, to analyze user activity data by departments that come from each of the integrated platforms (which are also referred to herein as "integrations"). However, users cannot modify or choose metadata fields that they may desire to use as groups. Consequently, outcomes from the current group reporting approach are rather limited, rigid, and not scalable.

To this end, embodiments disclosed herein take a customizable approach in which users can choose which field(s) to use to generate group mapping. In some embodiments, a new group reporting tool includes a group reporting configuration user interface with various types of metadata fields.

Figure 1:
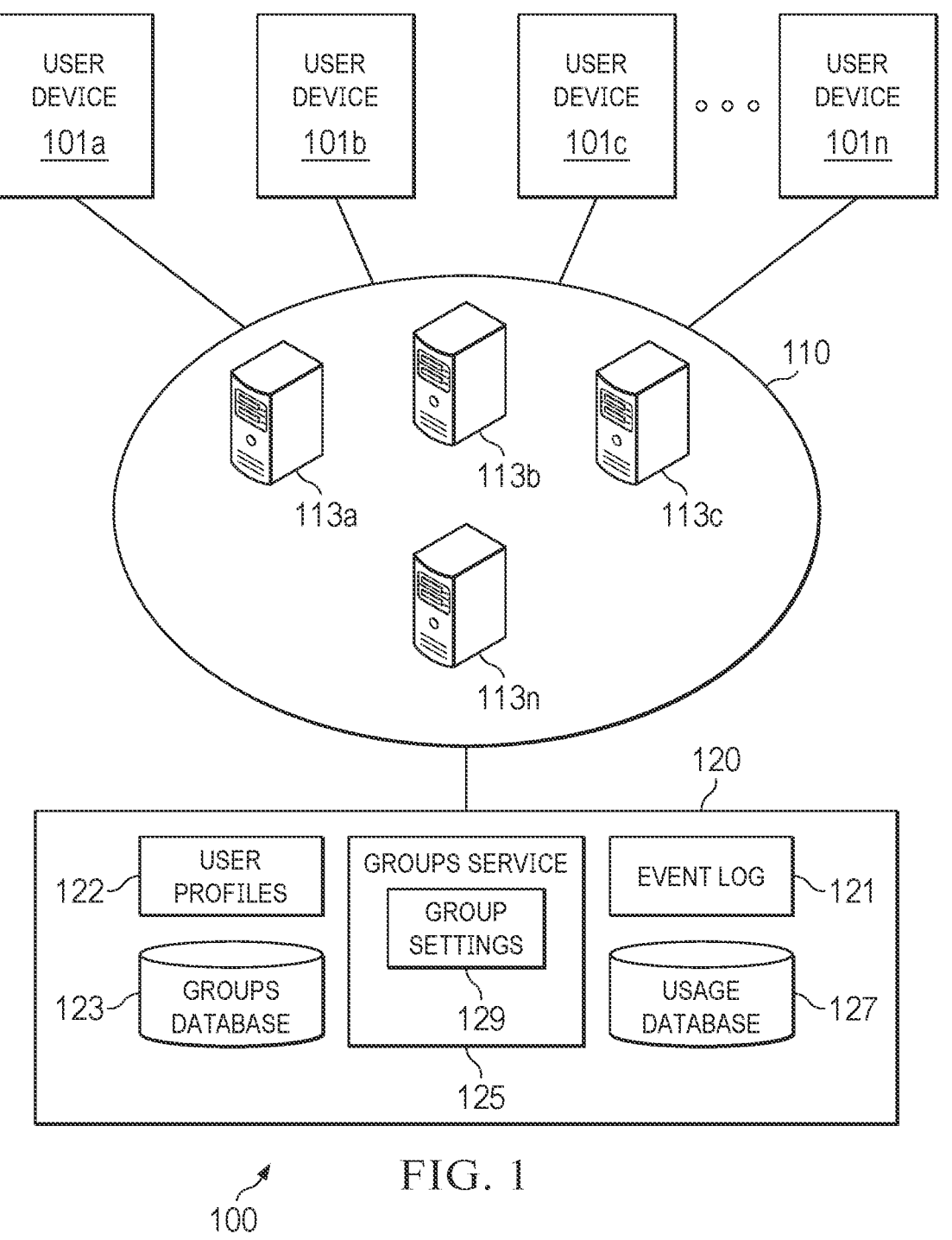
FIG. 1 depicts a computing environment where an example of a system disclosed herein can be implemented.

Referring to FIG. 1, which depicts an enterprise computing environment 100 where an example of an IAM system 120 disclosed herein can be implemented, the new group reporting tool can be implemented as a groups service 125 provided to user devices (e.g., user devices 101a, 101b, 101c, . . . , 101n). An authorized user with the appropriate permission (e.g., an administrator of the IAM system 120) can log into the groups service 125 (e.g., through SSO 110) and navigate to a group reporting configuration user interface (e.g., a group settings page 129) and select metadata field(s) (which, in this disclosure, may also be referred to as "attributes") as group(s).

End users of integrations 113a, 113b, 113c, . . . , 113n often have several different attributes that might be helpful to use as attributes for group reporting based usage. For example, a user might have a department of "Engineering", a team name of "platform", and a location of "Austin, TX". All of these fields might be helpful to use as a basis for group reporting. These fields ultimately are limitless in possibilities. The customizable approach disclosed herein allows an authorized user to pick exactly which field(s) to use to generate group mappings.

At the backend, the groups service 125 can track the group(s) across the enterprise computing environment 100 and stores activity data related to the group(s) in a usage database (e.g., the usage database 127). In some embodiments, this tracking may include parsing and examining an event log 121 of the IAM system 120 that stores end user sign-in events, each event including user information and a time when an end user signs in (e.g., through SSO 110). In some embodiments, a usage history containing the user information can be retrieved directly from the usage database (e.g., event log processing takes place independently of group mapping activities.

Using the user information, the groups service 125 can obtain (e.g., from a user profile store 122 or from a usage history stored in the usage database 127) a user profile for each end user that accesses any one or more of the integrated platforms (e.g., integrations 113a, 113b, 113c, . . . , 113n) through the respective frontend applications. From the user profile, the groups service 125 can obtain account information which contains data fields (i.e., attributes) such as "department," "email address," etc. In this way, the groups service 125 can determine to what departments the end users signing in through SSO 110 belong and generate groups based on their department (or any configuration parameter).

In some embodiments, this group generation process can begin when a client (e.g., an authorized user) initiates or otherwise provides a "mapping" instruction to the groups service 125. In response, the groups service 125 obtains user data from the event log 121 and starts processing (e.g., grouping by the configured mapping attributes such as "department"). Then for each group, the groups service 125 can determine what applications the end users have accessed and how many times (counts) and generate group(s) based on the user-selected/configured mapping metadata field(s) and stores the group(s) in a groups database (e.g., the groups database 123). In some embodiments, the groups service 125 can generate a report (e.g., a web page) with the findings (e.g., costs for users accessing those applications) for presentation through a user interface.

Figure 2:
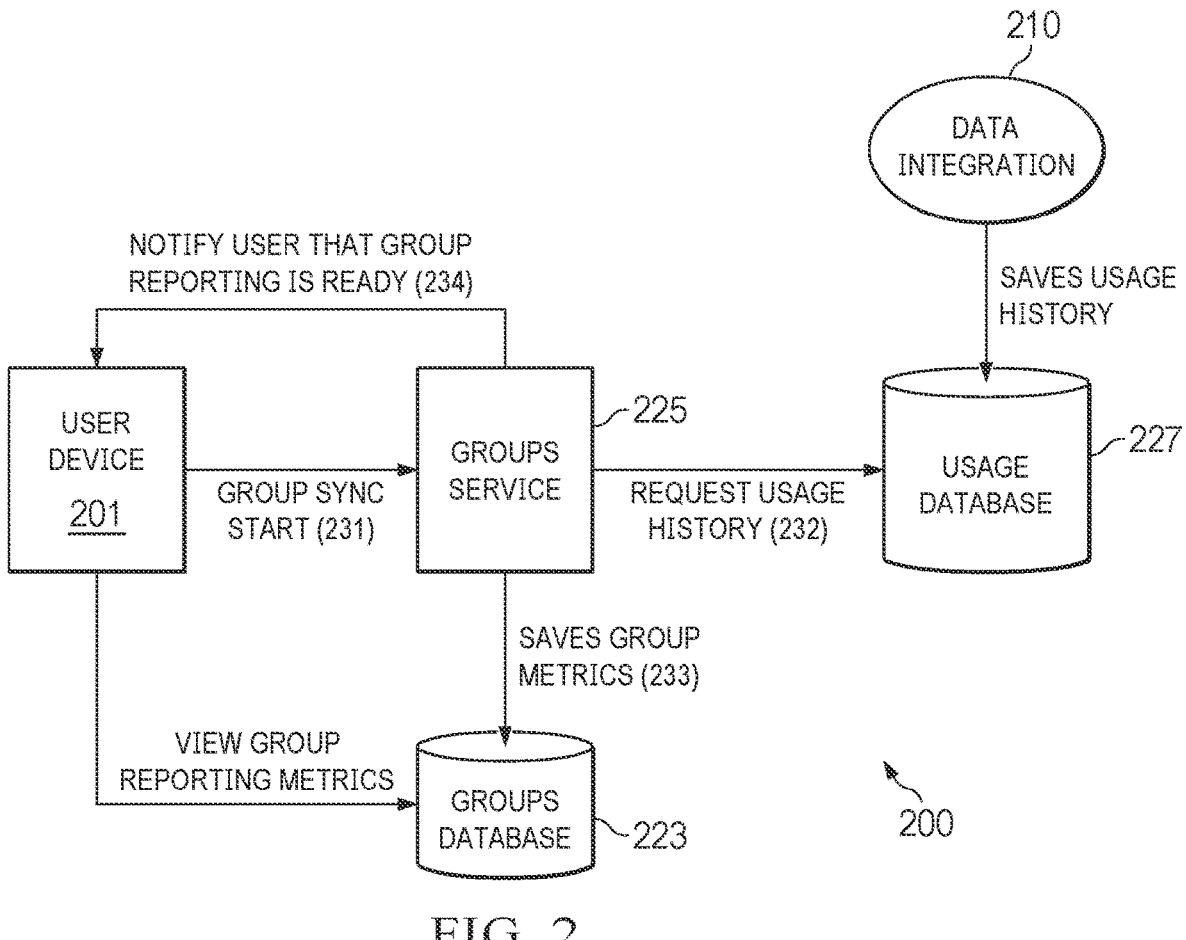
FIG. 2 depicts an example of a system architecture according to some embodiments disclosed herein.

FIG. 2 depicts an example of a system architecture according to some embodiments disclosed herein. In the example of FIG. 2, an authorized user selects, through a user interface (e.g., FIG. 3) on a user device 201, a metadata field (e.g., "department") for mapping. This selection triggers or otherwise starts (231) a group sync process, which causes a groups service 225 to fetch (232) a usage history from a usage database 227. The usage history can include when (e.g., a recorded time point or timestamp) an end user accesses an integration 210 (e.g., a software product) as well as the end user's group membership. The groups service 225 inspects all end users this way and generates a set of distinct groups based on the mapping that is configured. After a particular group's metrics are processed, they are saved (233) to a groups database 223. Once all the groups have been processed, the user is notified (234) that the metrics are ready to view.

In this example, the employee usage data and group membership are derived from the data integration 210. The data integration 210 can be an SSO application, or any other data source which indicates what group a user is in, as well as which dates the user used particular software products.

Figure 6:
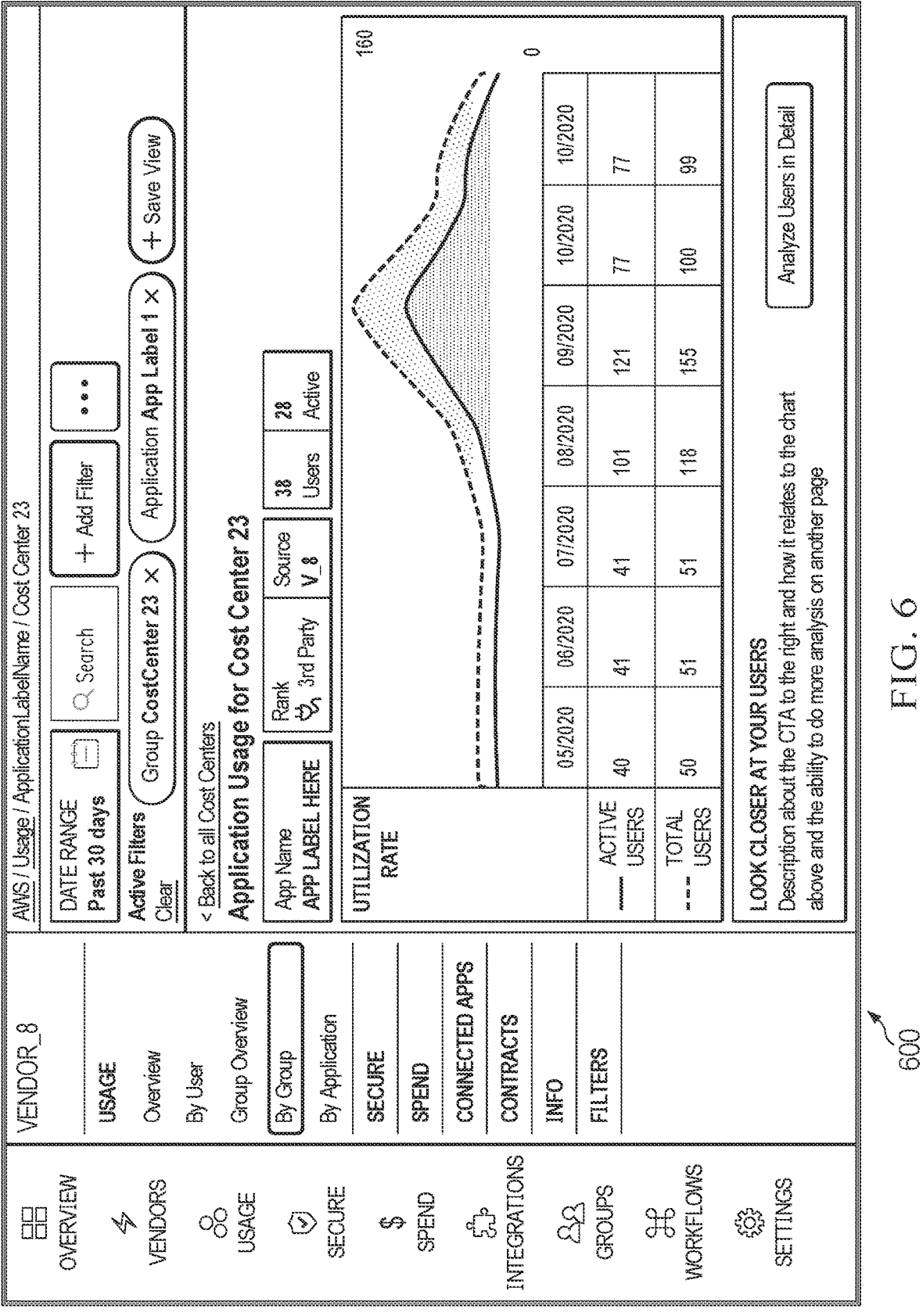
FIG. 6 depicts an example of a user interface showing a count of users for a particular software product according to some embodiments disclosed herein.

In some embodiments, the group reporting tool includes a user interface with a group configuration page (FIG. 3), a group listing page (FIG. 4), and individual vendor group pages (FIG. 6). These pages display different data for different groups.

FIG. 3 depicts an example of a user interface showing a group settings page 300 through which an authorized user representing a client of an IAM system can select metadata fields to enable as groups for tracking activities across an enterprise according to some embodiments disclosed herein. The group settings page 300 can be used to configure the groups to be indexed for aggregations. This allows the groups to be built on top of metadata that flows through the IAM system so that the group reporting tool can take advantage of the normalization that already happens for each integration.

In this example, the authorized user has selected the "department" field 301 for all ingested users from an SSO integration.

As a non-limiting example, suppose those users have the following properties:

email, department
    alex@intello.io, analytics
    shlomo@intello.io, engineering
    dave@intello.io, analytics
    aimee@intello.io, platform Given these users and based on the user-selected "department" field, the following groups can be generated:
    analytics
    engineering
    platform For the purpose of illustration, the "department" field 301 is shown in FIG. 3 under the "selected fields." The group settings page 300 shows a variety of fields 350 that the user can choose as the basis for a group. The next step is metric aggregation. Following the above example, suppose the usage history contains the following software usage data for the above users, indicating the software used and the date that they used it on:
    email, software name, usage date
    alex@intello.io, integration_1, 2022-01-01
    alex@intello.io, integration_2, 2022-01-01
    shlomo@intello.io, integration_1, 2022-01-01
    dave@intello.io, integration_2, 2022-01-01
    aimee@intello.io, integration_2, 2022-01-01

Based on the software usage data, each user's associated group(s) can be determined and used to increment (e.g., count) the metrics for each associated group. In this example, the resulting data would look like so:
    group name, software name, usage date, count
    analytics, integration_1, 2022-01-01, 1
    analytics, integration_2, 2022-01-01, 2
    platform, integration_1, 2022-01-01, 1
    engineering, integration_1, 2022-01-01, 1

This solution works if a user solely wants to look at day-over-day totals and not do any aggregation. However, if the user wants to find the distinct number of users over an arbitrary time window, the system cannot simply sum up counts from multiple days as this could lead to users being counted twice and leading to incorrect metrics.

To solve this problem, and to avoid having to store data for potentially 100,000+ users, the group reporting feature disclosed herein can leverage HyperLogLog to determine an accurate count of distinct users when distinct counts are aggregated over multiple days. HyperLogLog is an algorithm that can solve the count-distinct problem by approximating the number of distinct elements in a multiset. Hyper-LogLog is known to those skilled in the art and thus is not further described herein.

Below is a contrived example that illustrates how the HyperLogLog data structure works in practice.

| Hash result | Binary value | Registry | First 1 Bit Position |
|---|---|---|---|
| 0 | 000000 | 0 | 4 |
| 26 | 011010 | 1 | 0 |
| 38 | 100110 | 2 | 1 |
| 14 | 001110 | 0 | 0 |

In this example, each user's group identifier is converted to an integer using a hash function. The goal of a hash function is to uniformly map the range of all possible inputs to distinct number values. Here, the example starts with hash results of 0, 26, 38, 14.

When the HyperLogLog data structure is created, a parameter called b is used to determine the registry that the result is stored in. This ultimately determines how much space is used to store the HyperLogLog. The larger b is, the more accurate the result is but the more hard-disk space is used. Given the binary representation of any arbitrary number, 50% have a trailing bit of 0, 25% have trailing bits of 00, 12.5% of trailing bits of 000, and 6.25% have trailing bits of 0000. Given 0000, the registry must have a lower number of distinct users because otherwise some of the bits must be set.

In the table, the b value is 2 for illustrative purposes. The first two digits in the binary representation then determine the registry that the hashed value goes in. The remaining digits are then placed into their respective registry.

Note that 0 and 14 belong to the same registry because they share the same first b digits. These two values are then combined using a bitwise OR operation, which means that if a bit is set in either input, then it will be set in the output. For example, 0110 OR 0111 equals 0111.

The number of leading zeros, shown in the last column, drives the calculation of distinct users. HyperLogLog uses a harmonic mean to reduce the bias towards extremes that might be found in one registry vs another. To get an estimate of number of distinct users, divide the number of buckets (4) by the harmonic mean of the non-zero values in the last column:

$$\frac{4}{\left(\frac{1}{4}+\frac{1}{1}\right)} = 3.2.$$

The result should be 4 distinct users (instead of 3.2). However, in practice, the b value likely would not be as small as 2, so more accurate results can be expected as the b value increases. In addition, the implementation of Hyper-LogLog usually stores values explicitly until a certain size threshold is reached. Before that threshold, all values are stored explicitly which leads to 100% accurate.

HyperLogLog allows the groups service disclosed herein to store only one row in the database for each group name, software name, and date trio. This solution allows the groups service disclosed herein to scale better with larger organizations. Otherwise, it is not feasible at scale to store a data point for every user, group, software name, and date combination.

FIGS. 4-6 illustrates how group reporting data can be presented. FIG. 4 depicts an example of a user interface showing a group value listing page 400 according to some embodiments disclosed herein. The group value listing page 400 shows a list of all the synced values for a selected group. A user can select a cost center and zoom in to view the corresponding usage. FIG. 5 depicts an example of a user interface showing a group value application listing 500 with usage data according to some embodiments disclosed herein. The group value application listing 500 displays all the vendor and application items available to view in more detail (usage data).

FIG. 6 depicts an example of a user interface showing a count of users for a particular software product according to some embodiments disclosed herein. This vendor page 600 displays the data for a given group, vendor, and application combination. A time series chart shows active/inactive users over time.

FIG. 7 is a flow chart that illustrates an example of a group reporting method 700 according to some embodiments. In this example, the group reporting method 700 includes providing, by a groups service of an IAM system, a user interface of the groups service on a user device (701). The user interface, in this case, includes a group settings page (e.g., FIG. 3). The group reporting method 700 further includes receiving, by the groups service through the group settings page, a selection of a metadata field (703). Responsive to the selection of the metadata field, the groups service, starts a group sync process which fetches a usage history from a usage database (705).

In some embodiments, the group reporting method 700 further includes determining, by the groups service based on the metadata field and the usage history, properties of end users of an enterprise accessing a software product integrated with the IAM system (707) and generating a plurality of groups based on the properties of the end users of the enterprise accessing the software product integrated with the IAM system (709). A group listing page or group reporting page containing the plurality of groups can then be generated for presentation on the user device (711).

In some embodiments, the group reporting method 700 can further include determining, based on the usage history, timepoints of when the end users of the enterprise accessing the software product and group memberships of the end users and generating, based on the timepoints, the software product, and the group memberships of the end users, a time series chart shows active and inactive users of the software product over time.

In some embodiments, the group reporting method 700 can further include determining, utilizing a count-distinct algorithm, an accurate count of distinct users of the enterprise over a time window. In some embodiments, the count-distinct algorithm comprises the HyperLogLog algorithm discussed above.

In some embodiments, the group reporting method 700 can further include receiving a selected group from the group listing page and generating a group value listing page containing a list of synced values for the selected group. In this case, the synced values contain vendors and applications for the selected group.

In some embodiments, the group reporting method 700 can further include receiving a selected vendor from the group value listing page and generating a vendor page with data for the selected group, the selected vendor, and the software product. The time series chart discussed above can be displayed through the vendor page.

In this way, the flexibility of the customizable approach to group reporting disclosed herein can allow clients of an IAM system to use the group reporting tool to analyze group data by arbitrary metadata fields. The metadata fields of the IAM system already include attributes that are unique per an integration. The invention disclosed herein leverages the metadata that the IAM system pulls in at a user level to enable custom grouping. In this way, clients can analyze data by almost any metadata field that the IAM system already specifies.

Using the metadata fields also allows any integration to support group-level reporting and not limited to the integrations that the IAM system initially was built out for. This allows various embodiments to address interesting questions like show me activity data by, for instance, Video Conferencing License Type. The group reporting tool can then generate a view showing how software product utilization across an enterprise breaks down by license types.

The group reporting tool can connect to other functionalities, such as Workflow Engine, Suggested Filters, and Saved Views, via application programming interfaces (APIs), allowing generation of intelligent recommendations for clients.

Figure 8:
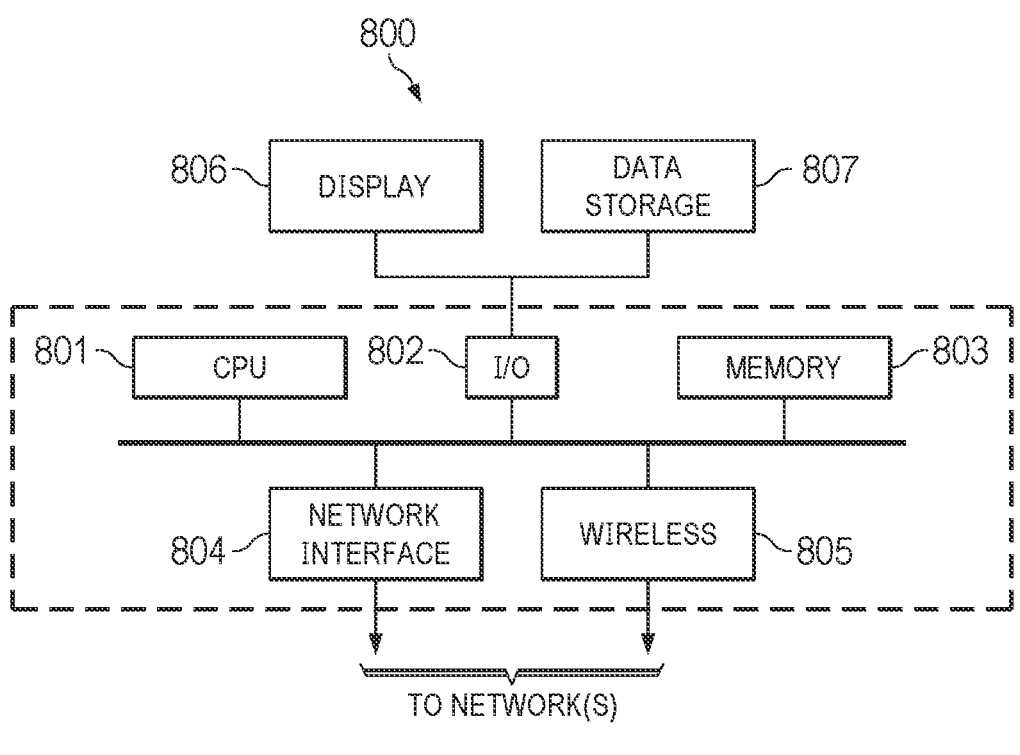
FIG. 8 depicts a diagrammatic representation of a data processing system for implementing an embodiment disclosed herein.

FIG. 8 depicts a diagrammatic representation of a data processing system for implementing an embodiment of an IAM system disclosed herein. As shown in FIG. 8, a data processing system 800 may include one or more central processing units (CPU) or processors 801 coupled to one or more user input/output (I/O) devices 802 and memory devices 803. Examples of I/O devices 802 may include, but are not limited to, keyboards, displays, monitors, touch screens, printers, electronic pointing devices such as mice, trackballs, styluses, touch pads, or the like. Examples of memory devices 803 may include, but are not limited to, hard drives (HDs), magnetic disk drives, optical disk drives, magnetic cassettes, tape drives, flash memory cards, random access memories (RAMs), read-only memories (ROMs), smart cards, etc.

The data processing system 800 can be coupled to display 806, information device 807 and various peripheral devices (not shown), such as printers, plotters, speakers, etc. through I/O devices 802. The data processing system 800 may also be coupled to external computers or other devices through a network interface 804, a wireless transceiver 805, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below.

ROM, RAM, and HD are computer memories for storing computer-executable instructions executable by the CPU or capable of being compiled or interpreted to be executable by the CPU. Suitable computer-executable instructions may reside on a non-transitory computer-readable medium (e.g., ROM, RAM, and/or HD), hardware circuitry or the like, or any combination thereof. Within this disclosure, the term "non-transitory computer-readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a non-transitory computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a non-transitory computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate non-transitory computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code).

Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The scope of the present disclosure should be determined by the following claims and their legal equivalents.

What is claimed is:

1. A method utilizing a groups service integrated within an Identity and Access Management (IAM) system executing on a processor to provide scalable and customizable group-level reporting based on dynamic user-defined attributes, the method comprising:

providing, by the groups service, a user interface of the groups service on a user device, the user interface comprising a group settings page configured to receive a user selection of arbitrary metadata fields that are unique per integration within the IAM system to define custom grouping criteria;

receiving, by the groups service through the group settings page on the user device, a selection of a metadata field;

responsive to the selection of the metadata field, starting, by the groups service, a group sync process which fetches a usage history from a usage database, the usage history containing user information, the user information comprising user activity data;

determining, by the groups service based on the metadata field selected from the group settings page and the usage history from the usage database, properties of end users of an enterprise accessing a software product on an integrated platform integrated with the IAM system, wherein the determining includes performing a correlation calculation utilizing the dynamically selected metadata field and a count-distinct algorithm comprising a HyperLogLog algorithm to map users to groups for the integrated platform based on user activity data to yield an accurate count of distinct users over a time window by storing only one row in the usage database for each group name, software name, and date trio, thereby reducing data storage requirements;

generating, by the groups service, a plurality of groups based on the properties of the end users of the enterprise accessing the software product on the integrated platform integrated with the IAM system; and generating, by the groups service, a group listing page containing the plurality of groups for presentation on the user device, thereby correlating complex user activity data with dynamically selected attributes to generate custom group-level access insights for identity and access management.

2. The method according to claim 1, further comprising:

determining, based on the usage history, timepoints of when the end users of the enterprise access the software product and group memberships of the end users.

3. The method according to claim 2, further comprising:

generating, by the groups service based on the timepoints, the software product, and the group memberships of the end users, a time series chart showing active and inactive users of the software product over time.

4. The method according to claim 1, further comprising:
receiving a selected group from the group listing page; and
generating a group value listing page containing a list of synced values for the selected group, the synced values containing vendors and applications for the selected group.

5. The method according to claim 4, further comprising:
receiving a selected vendor from the group value listing page; and
generating a vendor page with data for the selected group, the selected vendor, and the software product.

6. The method according to claim 1, wherein the count-distinct algorithm yields the accurate count of distinct users over the time window without duplicating user counts.

7. A system utilizing a groups service integrated within an Identity and Access Management (IAM) system executing on a processor to provide scalable and customizable group-level reporting based on dynamic user-defined attributes, the system comprising:
a processor;
a non-transitory computer-readable medium; and
instructions stored on the non-transitory computer-readable medium and translatable by the processor for:
providing a user interface of a groups service on a user device, the user interface comprising a group settings page configured to receive a user selection of arbitrary metadata fields that are unique per integration within the IAM system to define custom grouping criteria;
receiving, through the group settings page on the user device, a selection of a metadata field;
responsive to the selection of the metadata field, starting a group sync process which fetches a usage history from a usage database, the usage history containing user information, the user information comprising user activity data;
determining, based on the metadata field selected from the group settings page and the usage history from the usage database, properties of end users of an enterprise accessing a software product on an integrated platform integrated with the IAM system, wherein the determining includes performing a correlation calculation utilizing the dynamically selected metadata field and a count-distinct algorithm comprising a HyperLogLog algorithm to map users to groups for the integrated platform based on user activity data to yield an accurate count of distinct users over a time window by storing only one row in the usage database for each group name, software name, and date trio, thereby reducing data storage requirements;
generating a plurality of groups based on the properties of the end users of the enterprise accessing the software product on the integrated platform integrated with the IAM system; and
generating a group listing page containing the plurality of groups for presentation on the user device, thereby correlating complex user activity data with dynamically selected attributes to generate custom group-level access insights for identity and access management.

8. The system of claim 7, wherein the instructions are further translatable by the processor for:

determining, based on the usage history, timepoints of when the end users of the enterprise access the software product and group memberships of the end users.

9. The system of claim 8, wherein the instructions are further translatable by the processor for:
generating, based on the timepoints, the software product, and the group memberships of the end users, a time series chart showing active and inactive users of the software product over time.

10. The system of claim 7, wherein the instructions are further translatable by the processor for:
receiving a selected group from the group listing page; and
generating a group value listing page containing a list of synced values for the selected group, the synced values containing vendors and applications for the selected group.

11. The system of claim 10, wherein the instructions are further translatable by the processor for:
receiving a selected vendor from the group value listing page; and
generating a vendor page with data for the selected group, the selected vendor, and the software product.

12. The system of claim 7, wherein the count-distinct algorithm yields the accurate count of distinct users over the time window without duplicating user counts.

13. A computer program product for utilizing a groups service integrated within an Identity and Access Management (IAM) system to provide scalable and customizable group-level reporting based on dynamic user-defined attributes, the computer program product comprising a non-transitory computer-readable medium storing instructions translatable by a processor for:
providing a user interface of a groups service on a user device, the user interface comprising a group settings page configured to receive a user selection of arbitrary metadata fields that are unique per integration within the IAM system to define custom grouping criteria;
receiving, through the group settings page on the user device, a selection of a metadata field;
responsive to the selection of the metadata field, starting a group sync process which fetches a usage history from a usage database, the usage history containing user information, the user information comprising user activity data;
determining, based on the metadata field selected from the group settings page and the usage history from the usage database, properties of end users of an enterprise accessing a software product on an integrated platform integrated with the IAM system, wherein the determining includes performing a correlation calculation utilizing the dynamically selected metadata field and a count-distinct algorithm comprising a HyperLogLog algorithm to map users to groups for the integrated platform based on user activity data to yield an accurate count of distinct users over a time window by storing only one row in the usage database for each group name, software name, and date trio, thereby reducing data storage requirements;
generating a plurality of groups based on the properties of the end users of the enterprise accessing the software product on the integrated platform integrated with the IAM system; and
generating a group listing page containing the plurality of groups for presentation on the user device, thereby correlating complex user activity data with dynamically selected attributes to generate custom group-level access insights for identity and access management.

14. The computer program product of claim 13, wherein the instructions are further translatable by the processor for:

determining, based on the usage history, timepoints of when the end users of the enterprise access the software product and group memberships of the end users.

15. The computer program product of claim 14, wherein the instructions are further translatable by the processor for:

generating, based on the timepoints, the software product, and the group memberships of the end users, a time series chart showing active and inactive users of the software product over time.

16. The computer program product of claim 13, wherein the instructions are further translatable by the processor for:

receiving a selected group from the group listing page; and generating a group value listing page containing a list of synced values for the selected group, the synced values containing vendors and applications for the selected group.

17. The computer program product of claim 16, wherein the instructions are further translatable by the processor for:

receiving a selected vendor from the group value listing page; and generating a vendor page with data for the selected group, the selected vendor, and the software product.

18. The computer program product of claim 13, wherein the count-distinct algorithm yields the accurate count of distinct users over the time window without duplicating user counts.

* * * * *